United States Patent
Parikh et al.

(10) Patent No.: US 10,338,701 B2
(45) Date of Patent: Jul. 2, 2019

(54) ACTIVE BRUSH STYLUS

(71) Applicant: INTEL CORPORATION, Santa Clara, CA (US)

(72) Inventors: Kunjal Parikh, San Jose, CA (US); Arvind Kumar, Beaverton, OR (US); Jordan E. Maslov, Hillsboro, OR (US); Shantanu Kulkarni, Hillsboro, OR (US); Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/652,670

(22) Filed: Jul. 18, 2017

(65) Prior Publication Data
US 2019/0025949 A1    Jan. 24, 2019

(51) Int. Cl.
*G06F 3/038*     (2013.01)
*G06F 3/044*     (2006.01)
*G06F 3/0354*    (2013.01)

(52) U.S. Cl.
CPC ........ *G06F 3/03545* (2013.01); *G06F 3/0383* (2013.01); *G06F 3/044* (2013.01)

(58) Field of Classification Search
CPC ..... G06F 3/03545; G06F 3/0383; G06F 3/044
USPC .......... 345/156–184, 571; 434/365; 205/117; 15/1.51, 167.1
See application file for complete search history.

(56) References Cited

U.S. PATENT DOCUMENTS

| | | | | |
|---|---|---|---|---|
| 2,582,939 | A * | 1/1952 | Frederick | B23Q 11/0064 15/1.51 |
| 5,277,785 | A * | 1/1994 | Van Anglen | C25D 5/06 205/117 |
| 5,420,607 | A * | 5/1995 | Miller | G06F 3/03542 345/156 |
| 5,546,624 | A * | 8/1996 | Bock | A46B 7/04 15/167.1 |
| 6,226,000 | B1 * | 5/2001 | Richens | G06T 15/04 345/419 |
| 6,595,219 | B2 * | 7/2003 | Anderson | A46B 9/10 132/123 |
| 9,105,913 | B2 * | 8/2015 | Mayer | H01M 8/04186 |
| 2003/0117408 | A1 * | 6/2003 | Forsline | G06F 3/03545 345/581 |
| 2009/0091396 | A1 * | 4/2009 | Jian | H03L 7/099 331/16 |
| 2012/0171657 | A1 * | 7/2012 | Ortins | A46B 9/04 434/365 |
| 2013/0201162 | A1 * | 8/2013 | Cavilia | G06F 3/03545 345/179 |
| 2014/0340318 | A1 * | 11/2014 | Stringer | G06F 3/03545 345/173 |
| 2015/0248793 | A1 * | 9/2015 | Abovitz | G06F 16/7837 345/633 |

(Continued)

FOREIGN PATENT DOCUMENTS

WO    WO 2009131452    * 10/2009

*Primary Examiner* — Prabodh M Dharia
(74) *Attorney, Agent, or Firm* — International IP Law Group, P.L.L.C.

(57) ABSTRACT

The techniques taught in this application include, generally, a brush stylus that includes a number of active bristles. When the brush stylus is in contact with a touchscreen on the computing device, the active bristles provide data to the brush stylus, a computing device the other brush stylus, or both.

25 Claims, 10 Drawing Sheets

(56) References Cited

U.S. PATENT DOCUMENTS

| | | | |
|---|---|---|---|
| 2015/0346825 A1* | 12/2015 | Chiu | G06F 3/017 |
| | | | 345/158 |
| 2016/0026253 A1* | 1/2016 | Bradski | G02B 27/225 |
| | | | 345/8 |
| 2017/0046041 A1* | 2/2017 | Lee | G06F 3/0488 |
| 2017/0100223 A1* | 4/2017 | Silverberg | A61C 17/228 |
| 2018/0046268 A1* | 2/2018 | Keidar | G06F 3/0383 |

* cited by examiner

ACTIVE BRUSH STYLUS

TECHNICAL FIELD

The present disclosure relates generally to a stylus for a touchscreen. More specifically, the present techniques relate to a stylus that includes a simulated brush effect for line control.

BACKGROUND

Many current styluses that may be used to draw lines of different thicknesses on computing devices may use a thin tip stylus coupled with pressure sensors and tilt sensors to generate stroke information. The stroke information may then be used to change the thickness of the line drawn on the display. Some styluses use a single thick tip, but at the expense of precision and aesthetic experience. Further, current styluses and software generally determine the touch of the tip of the stylus as the point of a contact of the stylus with the display and use that as the position of the stylus. The software may use approximations of tilt, pressure, velocity, or contact size in order to simulate the look of strokes. Accordingly, current solutions may create a disconnect between the user experience and what is being drawn on the screen.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Current thin tip styluses do not provide an aesthetic experience for content creators, artist, and the like, for example in the emulation of the field of a brush. Several approaches have used pressure and tilt inputs to emulate different stroke information, but are still substantially different in feel from a real brush.

A brush stylus comprising active bristles that can be coupled with circuitry to determine activation pressure and location is disclosed herein. For example, the bristles include active bristles that may be calibrated to provide a signal, such as a voltage, that is proportional to bending of the active bristles. This may be used to provide a stylus experience that approaches that of a normal artist's brush.

In some examples, the active bristles of the brush stylus may be conductive bristles that each register as a touch point, or trigger a touch event in software, on a multi-touch display screen, herein termed a touchscreen. For example, a computing device may use existing pixel level in-cell touch technology to identify input from each active bristle acting as an individual stylus for sensor detection. The conductive bristles may be narrowly spaced, for example, about 50 µm, 100 µm, 200 µm, or higher, depending on the number of possible touch points and the touch sensitivity of the display screen to be used with the brush stylus.

Figure 1:
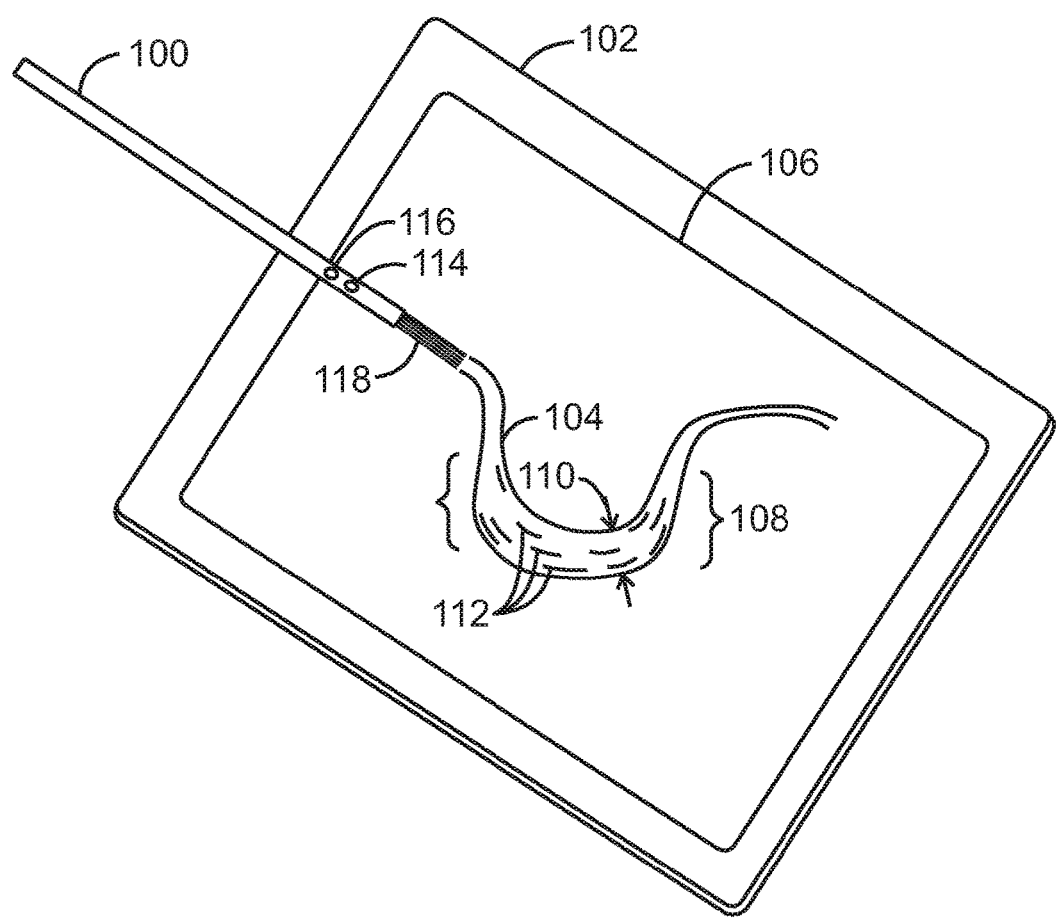
FIG. 1 is a drawing of an example of a brush stylus used with a computing device to draw a line of variable thickness on a touchscreen of the computing device.

FIG. 1 is a drawing of an example of a brush stylus 100 used with a computing device 102 to draw a line 104 of variable thickness on a touchscreen 106 of the computing device 102. As the brush stylus 100 is moved across the touchscreen 106 the pressure of the brush stylus 100 may be changed to spread the bristles out. This may result in a region 108 of the line 104 having a wider thickness 110, simulated texture 112, or both. The computing device 102 may be any of a number of devices, including tablet computers, laptop computers, all-in-one computers, presentation screens, smart signs, smart phones, or touch enabled monitors, among others.

The brush stylus 100 may include controls such as an actuator 114 that may be used to direct the brush stylus 100 to send an activation signal to the computing device 102 to create a line on the touchscreen 106. For example, the actuator 114 may be a button that sends a signal when it is held down. Another actuator 116 may be used to control other features of the brush stylus 100, for example, allowing the retraction of a number of the bristles 118 to allow the brush stylus 100 to function as a normal single-point touch stylus as described with respect to FIG. 4. The actuator 114 may also be used for other functions, such as activating a mouse click to select an item on the touchscreen 106.

Figure 2A:
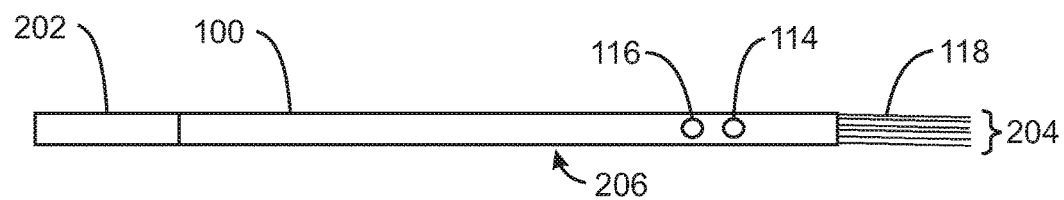
FIG. 2A is a top view of an example of a brush stylus in accordance with some embodiments of the present techniques.

FIG. 2A is a top view of an example of a brush stylus 100 in accordance with some embodiments of the present techniques. Like numbered items are as described with respect to FIG. 1. The brush stylus 100 may have any number of configurations, including variations in size, conformation, and the like. In some examples, the brush stylus 100 may resemble a normal artist's brush. The brush stylus 100 may be powered, for example, by batteries inserted into a removable section 202. In other examples, the brush stylus 100 may be rechargeable, for example, by the insertion of the brush stylus 100 into a wireless charging station.

As the design of a brush stylus 100 may resemble an artist's brush, the bristles 118 of the brush stylus 100 may have a width 204 that closely approximates the width of the case 206 of the brush stylus 100. This may make the aesthetic experience of using the brush stylus 100 more closely match that of an artist's brush.

Accordingly, in various examples, different sizes may be selected for the brush stylus 100. These may range from a narrow artist's brush with the tip of about 1 mm in width, up to a broad brush, for example, with a width of about 25 mm, or higher, with any number of other widths being possible. Larger widths may be selected and used with larger devices, for example, a large touchscreen display device, such as a presentation screen, may allow the use of brush styli having bristles 118 with a width 204 greater than about 50 mm, or higher. The design of the bristles 118 may also be anisotropic, for example, with a wide cross-section and a pointed tip, as further described with respect to FIG. 2B.

Figure 2B:
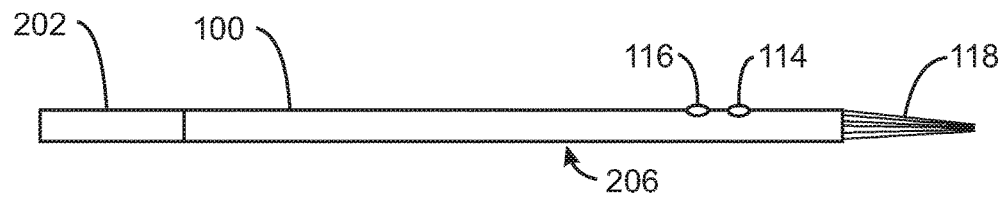
FIG. 2B is a side view of a brush stylus in accordance with some embodiments of the present techniques.

FIG. 2B is a side view of a brush stylus 100 in accordance with some embodiments of the present techniques. Like numbered items are as described with respect to FIGS. 1 and 2A. As shown in the side view, the bristles 118 may be brought to a pointed tip in at least one dimension to further simulate an artist's brush.

Figure 3A:
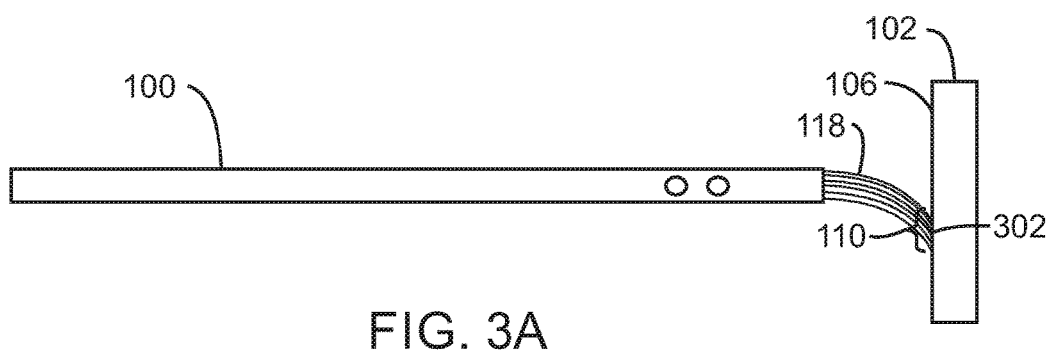
FIG. 3A is a drawing of the brush stylus when the bristles are bending in the same direction in contact with the drawing surface of the computing device in accordance with some embodiments of the present techniques.

FIG. 3A is a drawing of the brush stylus 100 when the bristles 118 are bending in the same direction in contact with the drawing surface of the computing device 102 in accordance with some embodiments of the present techniques. Like numbered items are as described with respect to FIG. 1. As the bristles 118 bend, the brush stylus 100 may use active bristles among the bristles 118 to detect the pressure of the bending and the direction of the bending, among other parameters.

This information may be provided from the brush stylus 100 to the computing device 102. The communication may be directly through data transferred through the active bristles to a stylus antenna in the touchscreen 106 of the computing device 102. In some examples, the data may be transferred from the brush stylus to the computing device 102 through radio connection, such as a Bluetooth® link.

The computing device 102 may use an average of the contact points of the active bristles to determine a center contact point 302 for the brush stylus 100. In some embodiments, the center contact point 302 may correspond to a single active bristle, for example, located in the center of the bristles. The center contact point 302 may then be used along with the information on the pressure and direction of bending of the active bristles to determine the thickness 110 of the line and the texture to be displayed on the touchscreen 106. Other information may be used to determine the thickness and texture to be displayed, as discussed further with respect to FIG. 3B.

Figure 3B:
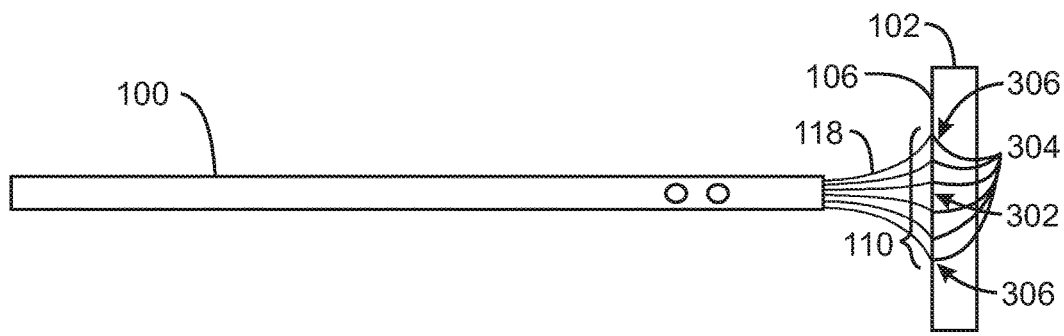
FIG. 3B is a drawing of the brush stylus when the bristles are bending in different directions in contact with a drawing surface in accordance with some embodiments of the present techniques.

FIG. 3B is a drawing of the brush stylus 100 when the bristles are bending in different directions in contact with a drawing surface 102 in accordance with some embodiments of the present techniques. Like numbered items are as described with respect to FIG. 1. In some examples, as described herein, active bristles may be detected as individual touch points 304 on the touchscreen 106.

The computing device 102 may use an average of the individual touch points 304 of the active bristles to determine the center contact point 302 for the brush stylus 100. Each of the individual touch points 304 may be used to determine the thickness 110 of the line, for example, calculating the thickness based on the outermost touch points 306. In this example, the texture of the line may be determined by the pressure sensed by the active bristles.

Figure 4:
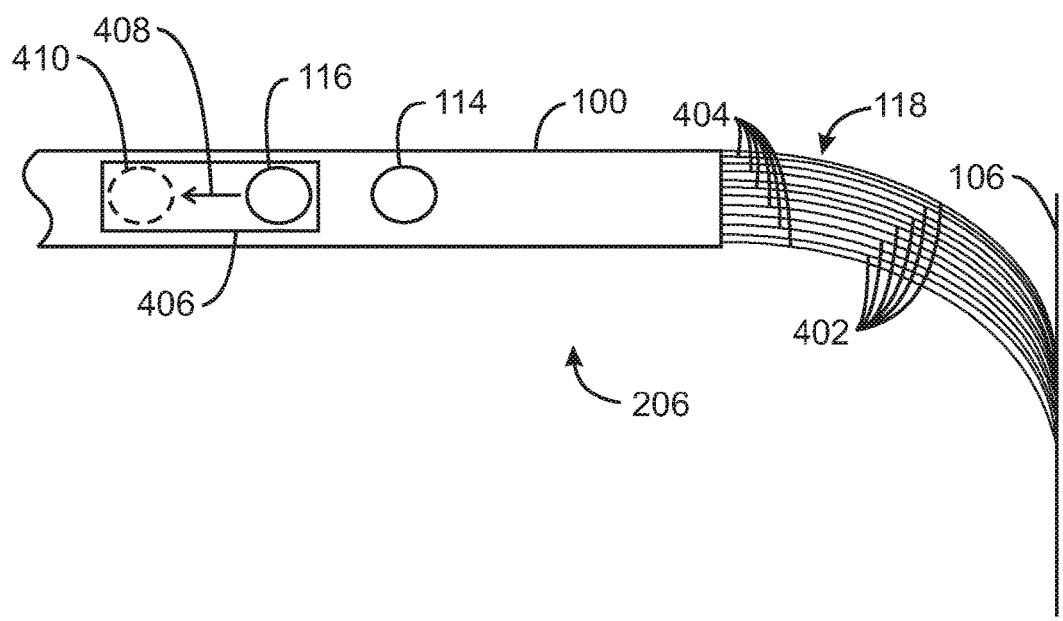
FIG. 4 is a close-up drawing of the head of the brush stylus when the bristles are bending in the same direction in contact with a touchscreen in accordance with some embodiments of the present techniques.

FIG. 4 is a close-up drawing of the head of the brush stylus 100 when the bristles 118 are bending in the same direction in contact with a touchscreen 106 in accordance with some embodiments of the present techniques. Like numbered items are as discussed with respect to FIG. 1. As shown in FIG. 4, not all of the bristles 118 in a brush stylus 100 need to be active bristles 402. For example, a subset of the bristles 118 may be active bristles 402 and another subset of the bristles 118 may be inactive bristles 404. The inactive bristles 404, may be included to give the brush stylus 100 a more aesthetic feel, for example, to simulate an artist's brush. The inactive bristles 404 may be made from synthetic polymer fibers, such as nylon, polyethylene terephthalate, and the like. In some examples, the inactive bristles 404 may be made from higher value materials such as camel hair, and other materials used in high-end artist's brushes.

The inactive bristles 404 may be chosen to have properties, such as flexibility and the like, to match the active bristles 402, for example, having similar flexibility, stiffness, length, and thickness, among others. This may also be adjusted by controlling the proportion of active bristles 402 to inactive bristles 404. The proportion of the bristles 118 that are active bristles 402 may be about 50%, 25%, 10%, 5%, 1%, or less. In some examples, fewer bristles 118 may be included and a higher proportion, or all, of the bristles 118, may be active bristles 402.

As described with respect to FIG. 1, the actuators 114 and 116 may be used to control operations of the stylus brush 100. For example, actuator 114 may be pressed to send an activation signal to a computing device to initiate drawing. The actuator 114 may be released to stop the activation signal and have the computing device stop drawing. Actuator 116 may be used to retract a portion of the bristles, for example, allowing a single brush stylus 100 to function with fewer bristles 118, or as a single point stylus, when the bristles 118 are retracted.

In one example, the actuator 116 may be a button that is pressed to release from a locking device in a sliding mechanism 406 and move 408 to a new location 410 prior to re-engaging with the locking device. As the button 116 is moved to the new location 410, it may retract a portion of the bristles 118 into the case 206 (FIG. 2) of the brush stylus 100. Releasing the button 116 at the new position may reengage the button with the locking mechanism to lock the bristles 118 in place. The function may be performed in reverse to slide the bristles 118 back out of the case 206 of the brush stylus 100.

Figure 5:
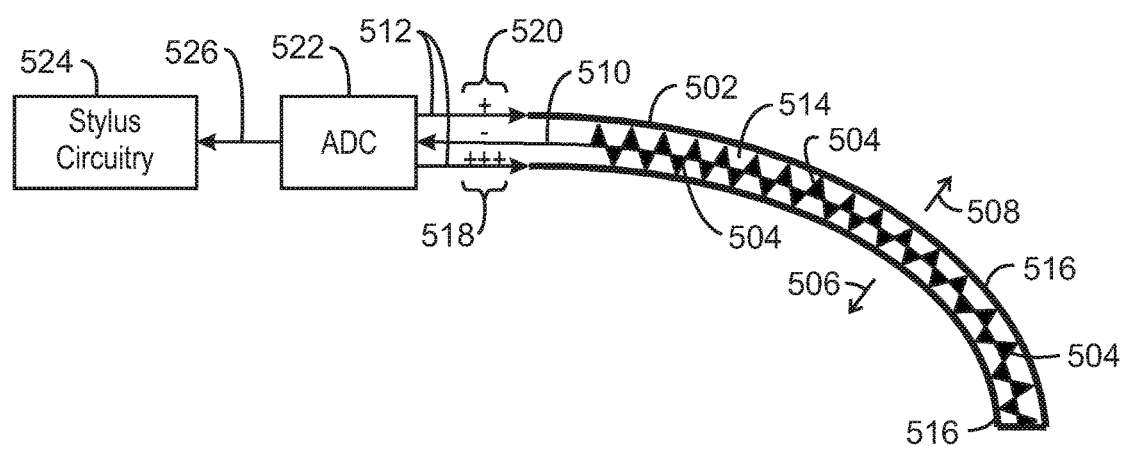
FIG. 5 is a schematic drawing of an example of an active bristle of the brush stylus in accordance with some embodiments.

FIG. 5 is a schematic drawing of an example of an active bristle 502 of the brush stylus 100 in accordance with some embodiments. In this example, the active bristle 502 uses piezoelectric crystals 504 to detect a bending pressure on the active bristle 502. To simplify the drawing, not every one of the piezoelectric crystals 504 is labeled. As the active bristle 502 is deflected, piezoelectric crystals 504 in the direction 506 of the bend are compressed, while piezoelectric crystals opposite 508 the bend are decompressed.

The active bristle 502 may include a center conductor 510 and a number of exterior conductors 512. Each of the piezoelectric crystals 504 may be in contact with the center conductor 510 and one of the exterior conductors 512. The piezoelectric crystals 504 may be held in place inside the active bristle 502 by a matrix 514. The matrix 514 may include any number of flexible polymeric materials. For example, the matrix 514 may include an inorganic or organic elastomer, such as a silicon rubber, a polybutylene, or a polybutadiene, among many others. The matrix 514 may couple a pressure applied to an outer sheath 516 to the piezoelectric crystals 504.

As the piezoelectric crystals 504 in the direction 506 of the bend are compressed, a higher voltage potential 518 may exist between an exterior conductor 512 in the direction 506 of the bend and the center conductor 512. Similarly, the decreased pressure opposite 508 the bend may result in a lower voltage potential 520 between an exterior conductor 512 opposite 508 the direction of the bend and the center conductor 512. The voltage potentials 518 and 520 may be measured by an analog-to-digital converter 522 which may provide the results of the measurement to the stylus circuitry 524, for example over a bus 526.

The voltage potentials 518 and 520 may be used to detect the amount of bending of the active bristle 502, for example, by determining a change in the voltage potentials 518 and 520 from a neutral position. Further, the voltage potentials 518 and 520 may be used to identify the direction 506 of the bend. In some examples, three or more exterior conductors 512 may be used to provide higher accuracy in the determination of the direction 506 of the bend.

It may be noted that any number of other technologies may be used in an active bristle 502 to detect a bending pressure on the active bristle 502. These may include, for example, other systems that change a current, a capacitance, a resistance, or other electrical properties of the active bristle 502 in response to a bending of the active bristle 502. These technologies may be used to detect the pressure of a bend, the direction of a bend, or both, for example, as discussed with respect to FIG. 6.

Figure 6:
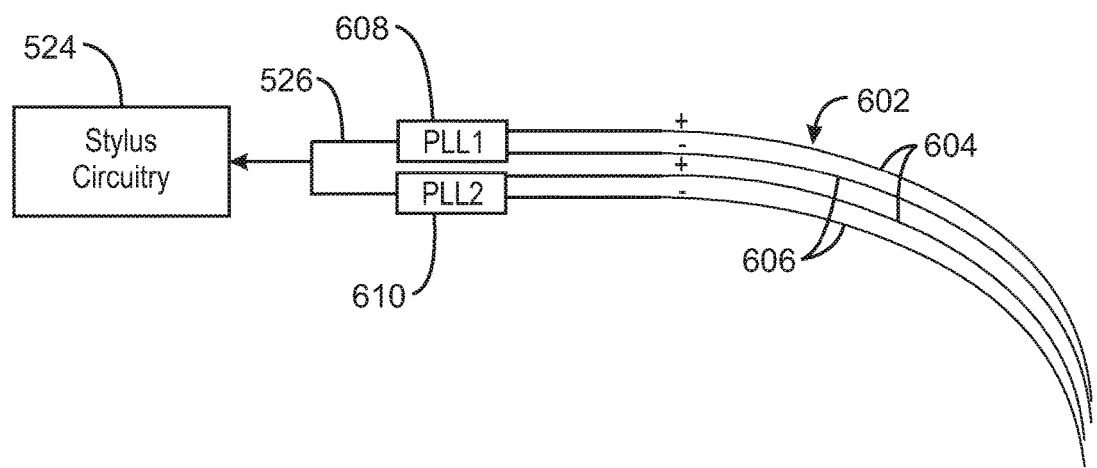
FIG. 6 is a schematic drawing of another example of active bristles in accordance with embodiments.

FIG. 6 is a schematic drawing of another example of active bristles 602 in accordance with embodiments. Like numbered items are as described with respect to FIG. 5. In this example, the active bristle 602 may detect bending and measure the pressure applied to the active bristles 602 in the brush stylus 100 using the measurement of capacitance between different bristles. For example, one portion of the active bristles 602 may be designated as positive bristles 604, while another set of bristles may be designated as negative bristles 606.

The active bristles 602 may be made from a polymeric material that includes a conductive additive. For example, the active bristles 602 may be made from nylon, polyethylene terephthalate, or another polymeric material to which a carbon additive has been blended during manufacturing. In some examples, the active bristles 602 may be formed as a multilayer structure with a central core that is conductive and an insulating layer formed over the central core to decrease the probability of adjacent active bristles 602 shorting out. The central core may be a wire with a polymeric layer formed over the wire.

The material that forms the positive and negative bristles 604 and 606 may be the same or different, however, different voltage potentials may be applied to each. The voltage potentials may be applied as an AC frequency, wherein a phase locked loop (PLL) 608 or 610 is used to calculate a capacitance difference between each pair of positive and negative bristles 604 and 606. Data from the PLLs 608 and 610 may be provided to the stylus circuitry 524, for example, over a bus 526.

In any active bristle design, such as the designs discussed with respect to FIGS. 5 and 6, the tip of each active bristle may be detected by a computing device as a touch, for example, by being conductive, by providing a capacitance change, or both. Accordingly, the active bristles may also provide a multi-touch brush stylus 100.

Figure 7:
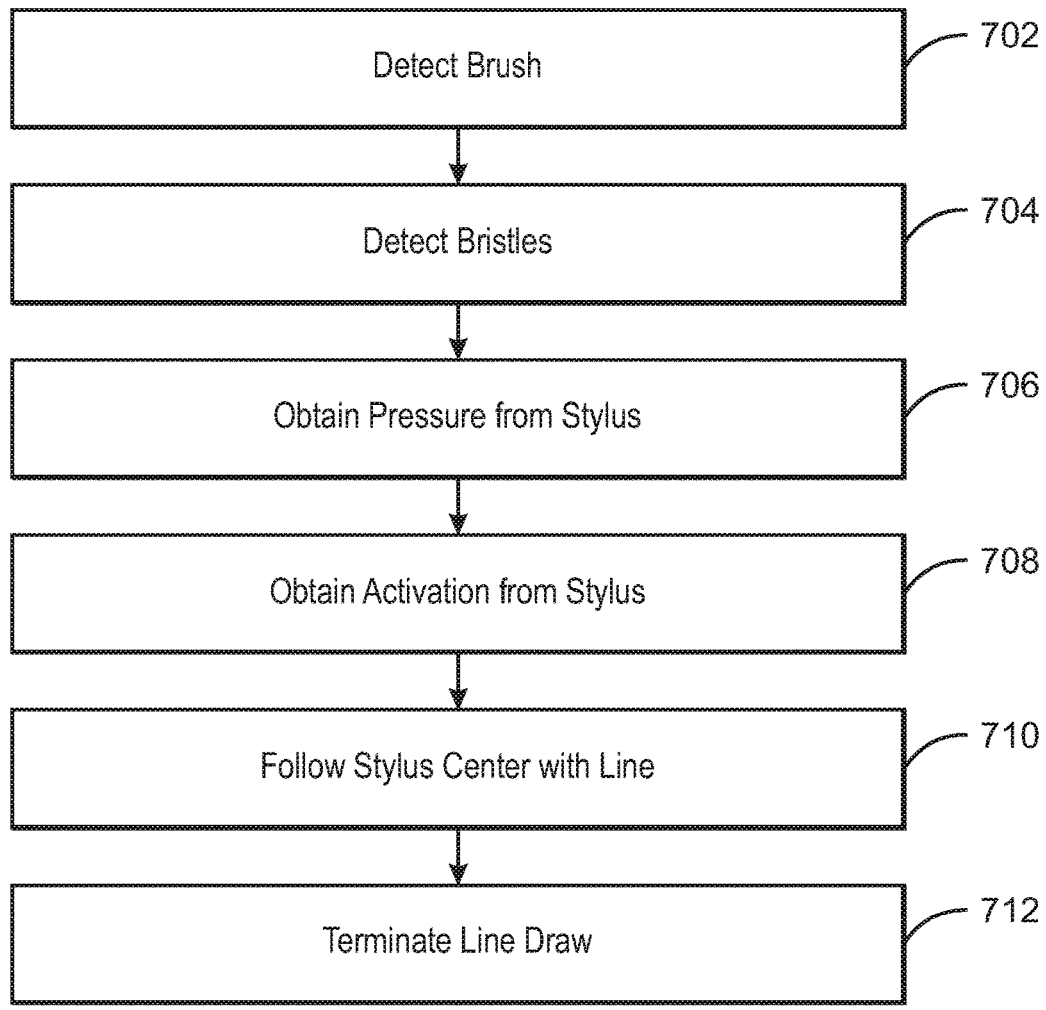
FIG. 7 is a process flow diagram of an example of a method for using a brush stylus to draw a line on a computing device in accordance with some embodiments of the present techniques.

FIG. 7 is a process flow diagram of an example of a method 700 for using a brush stylus to draw a line on a computing device in accordance with some embodiments of the present techniques. The method 700 may be implemented by a computing device, such as a tablet computer, all-in-one computer, smart phone, presentation screen, or any other computing device having a touch enabled screen.

The method 700 begins at block 702, when the computing device senses contact by the brush stylus on the touch surface of a touch screen. At block 704, the computing device may detect the touches of the individual active bristles. In some examples, the detection may be based on a single active bristle touching the touchscreen. In some examples, the touches of the individual active bristles may be used to determine the width of the line to be drawn on the display device.

At block 706, the computing device may obtain the pressure being used to touch the brush stylus to the display device. This may come from a radio communications with the brush stylus, for example, through a data interface to an antenna within the touchscreen of the display device.

At block 708, the computing device may determine that an activation signal from the brush stylus is present, for example, when an activation button is being held in a pressed position on the brush stylus. At block 710, the computing device may draw a line on the display device following the center of the contact of the brush stylus. The width of the line, and the texture shown for the line, may depend on the pressure obtained from the brush stylus. Other methods may be used to determine a texture, such as basing the texture on the touch points of each of the individual active bristles in contact with the touchscreen. In this example, a more intense line may be drawn at each touch point, fading out from the center of the touch point. this may further improve the simulation of an artist's brush.

At block 710, the line drawing may be terminated, for example, when the computing device determines that the activation signal from the brush stylus is no longer present. This may reflect that the activation button on the brush stylus has been released.

Not all of the blocks shown in the method 700 need be present in every example. For example, the computing device may use the location of the individual active bristles that are detected for drawing the line, and may not obtain pressure data from the brush stylus.

Further, the order of execution does not have to follow the arrangement of the blocks shown in FIG. 7. For example, the computing device may not detect individual active bristles or obtain pressure from the brush stylus until after the activation signal has been received from the brush stylus.

Additional operations may be present in addition to the blocks shown in the method 700. For example, the computing device may detect that active bristles have been retracted into the brush stylus, and change the performance of the application using the information from the brush stylus. For example, the retracted bristles may be deactivated, and a thinner line may be drawn using the remained extended bristles or a single active bristle.

Figure 8:
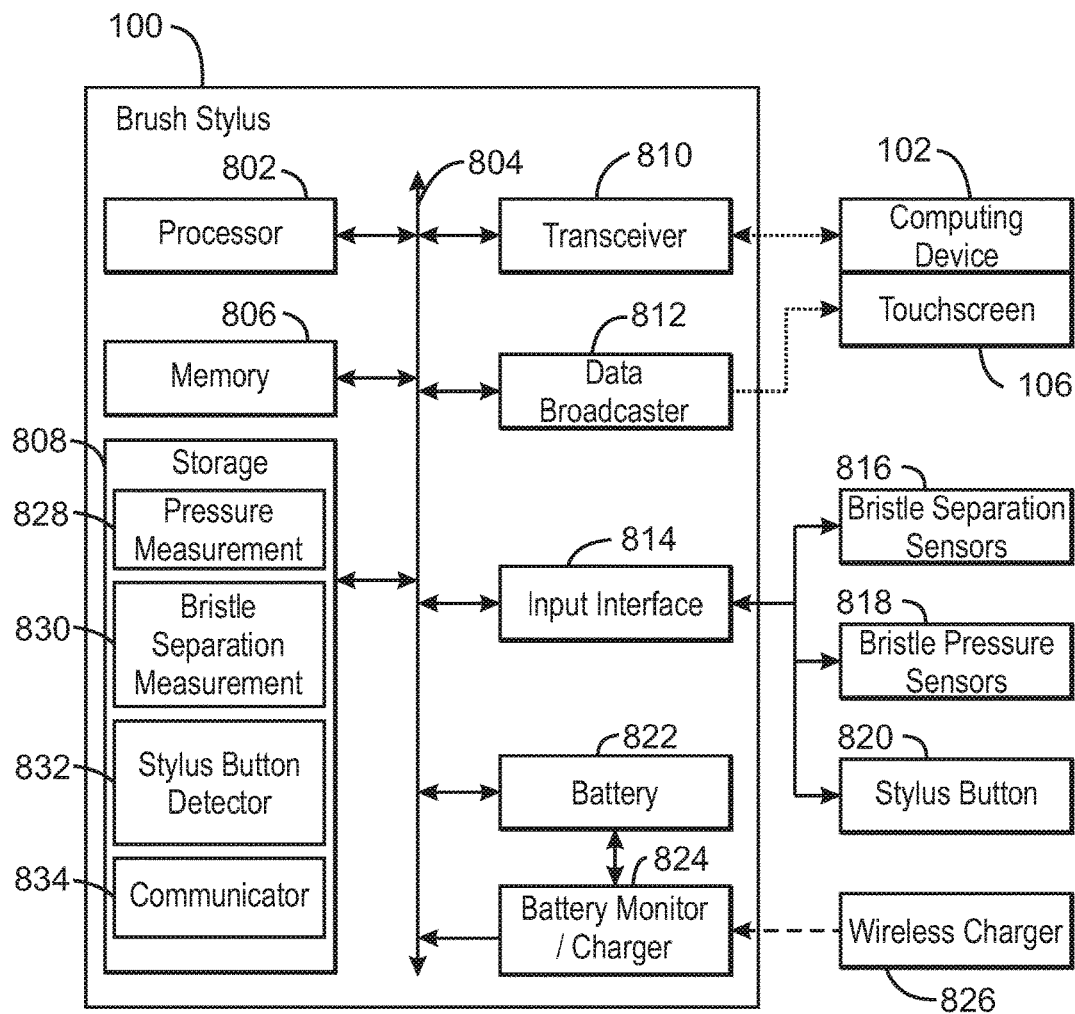
FIG. 8 is a block diagram of an example of components that may be present in a brush stylus in accordance with some embodiments.

FIG. 8 is a block diagram of an example of components that may be present in a brush stylus 100 in accordance with some embodiments. Like numbered items are as described with respect to FIG. 1. The brush stylus 100 may include any combinations of the components shown in the example. The components may be implemented as ICs, portions thereof, discrete electronic devices, or other modules, logic, hardware, software, firmware, or a combination thereof adapted in the brush stylus 100, or as components otherwise incorporated within a chassis of a larger system. The block diagram of FIG. 8 is intended to show a high-level view of components of the brush stylus 100. However, some of the components shown may be omitted, additional components may be present, and different arrangement of the components shown may occur in other implementations.

The brush stylus 100 may include a processor 802, which may be a microprocessor, an ultra-low voltage processor, an embedded processor, or other known processing element. As the brush stylus 100 is in a compact form, the processor 802 may be a part of a system on a chip (SoC) in which the processor 802 and other components are formed into a single integrated circuit, or a single package. As an example, the processor 802 may include an Intel® Architecture Core™ based processor, such as a Quark™, an Atom™, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

A system bus 804 may provide communications between system components. The system bus 804 may include any number of technologies, including industry standard architecture (ISA), extended ISA (EISA), peripheral component interconnect (PCI), peripheral component interconnect extended (PCIx), PCI express (PCIe), or any number of other technologies. The system bus 804 may be a proprietary bus, for example, used in a SoC based system. Further, the system bus 804 may include any combinations of these technologies, as well as other bus systems, such as an I²C interface, I³C interface, an SPI interface, point to point interfaces, and a power bus, among others. Different components may be coupled by different technologies in the system bus 804.

The processor 802 may communicate with other components, such as a system memory 806, over the system bus 804. The system memory 806 may include any number of memory devices of different types to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. As the stylus brush is a constrained functionality device in a small form factor, the system memory 806 may be on-die memory or registers associated with the processor 802, or both.

To provide for persistent storage of information such as data, applications, operating systems and so forth, a mass storage 808 may also be coupled to the processor 802, via the bus 804. To enable a thinner and lighter design for the brush stylus 100, the mass storage 808 may be an application specific integrated circuit (ASIC), on-die programmable registers associated with the processor, a floating-point gate array (FPGA), and the like.

The system bus 804 may couple the processor 802 to a transceiver 810, for example, for communications with a computing device 102. The transceiver 810 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others.

Depending on the use environment, such as in a large room, any number of other radios, configured for a particular wireless communication protocol, may be used for the connections to the computing device 102. For example, a WLAN unit may be used to implement Wi-Fi™ communications in accordance with the Institute of Electrical and Electronics Engineers (IEEE) 802.11 standard.

The communications with the computing device 102 may be implemented by low power direct communications that transmit data from a data broadcaster 812 through a touchscreen antenna associated with the touchscreen 106 of the computing device 102. The use of this type of direct communications may decrease the power demand of the brush stylus 100. In this example, the brush stylus 100 may not include the transceiver 810.

The system bus 804 may couple the processor 802 to an input interface 814 that is used to obtain input from the active bristles and the control buttons on the brush stylus 100. Bristle separation sensors 816 may determine the distance between bristles, for example, using a phase locked loop to detect capacitance changes between bristles, as described with respect to FIG. 6. Bristle pressure sensors 818 may determine the pressure applied to the bristles to determine an amount of band and, in some examples, the direction of the bend. This may be performed, for example, using piezoelectric crystal in the active bristles, as described with respect to FIG. 5. Stylus buttons 820 may be used to activate drawing or to retract bristles, for example, as described with respect to FIG. 4.

A battery 822 may power the brush stylus 100. The battery 822 may be a lithium ion battery, a metal-air battery, such as a zinc-air battery, an aluminum-air battery, a lithium-air battery, a hybrid super-capacitor, and the like.

A battery monitor/charger 824 may be included in the brush stylus 100 to track the state of charge (SoCh) of the battery 822. The battery monitor/charger 822 may be used to monitor other parameters of the battery 822 to provide failure predictions, such as the state of health (SoH) and the state of function (SoF) of the battery 822. The battery monitor/charger 824 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 824 may communicate the information on the battery 822 to the processor 802 over the bus 808. The battery monitor/charger 824 may also include an analog-to-digital (ADC) convertor that allows the processor 802 to directly monitor the voltage of the battery 822 or the current flow from the battery 822.

The battery parameters may be used to determine actions that the brush stylus 100 may perform, for example, when battery reserves are low, such as user alerts, transmission frequency changes, and the like. In some examples, the action may include sending an alert signal to the computing device 102 for display to a user, lighting an LED on the brush stylus 100, or both.

A wireless power transmitter 826 may provide the power wirelessly, for example, through a loop antenna in the brush stylus 100. A wireless battery charging circuit, such as an LTC4020 chip from Linear Technologies of Milpitas, Calif., among others, may be included in the battery monitor/charger 824. The wireless charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

In some examples, the wireless power transmitter 826 may be replaced with a power block, or other power supply coupled to a grid, which may be coupled with the battery monitor/charger 824 to charge the battery 822. For example, the power block may be coupled to the brush stylus 100 through a micro USB plug on the brush stylus 100.

The mass storage 812 may include a number of modules to implement the functions described herein. The modules may be software configured to be implemented by the processor 802, hardwired circuits, for example, built into an application specific integrated circuit (ASIC), or combination thereof.

The mass storage 812 may include a pressure measurement module 828 to measure the pressure applied to the brush stylus 100 through the bristle pressure sensors 818, for example, in the active bristles. A bristle separation measurement module 830 may measure the separation of active bristles using the bristle separation sensors 816, for example, in the active bristles.

A stylus button detector 832 may detect the pressing of a stylus button 820, and take appropriate action. The action may include using a communicator 834 to send an activation signal to a computing device 102, for example, through the transceiver 810, the data broadcaster 812, or both. The communicator 834 may also provide the pressure measurement, the bristle separation measurement, or both to the computing device 102.

Figure 9:
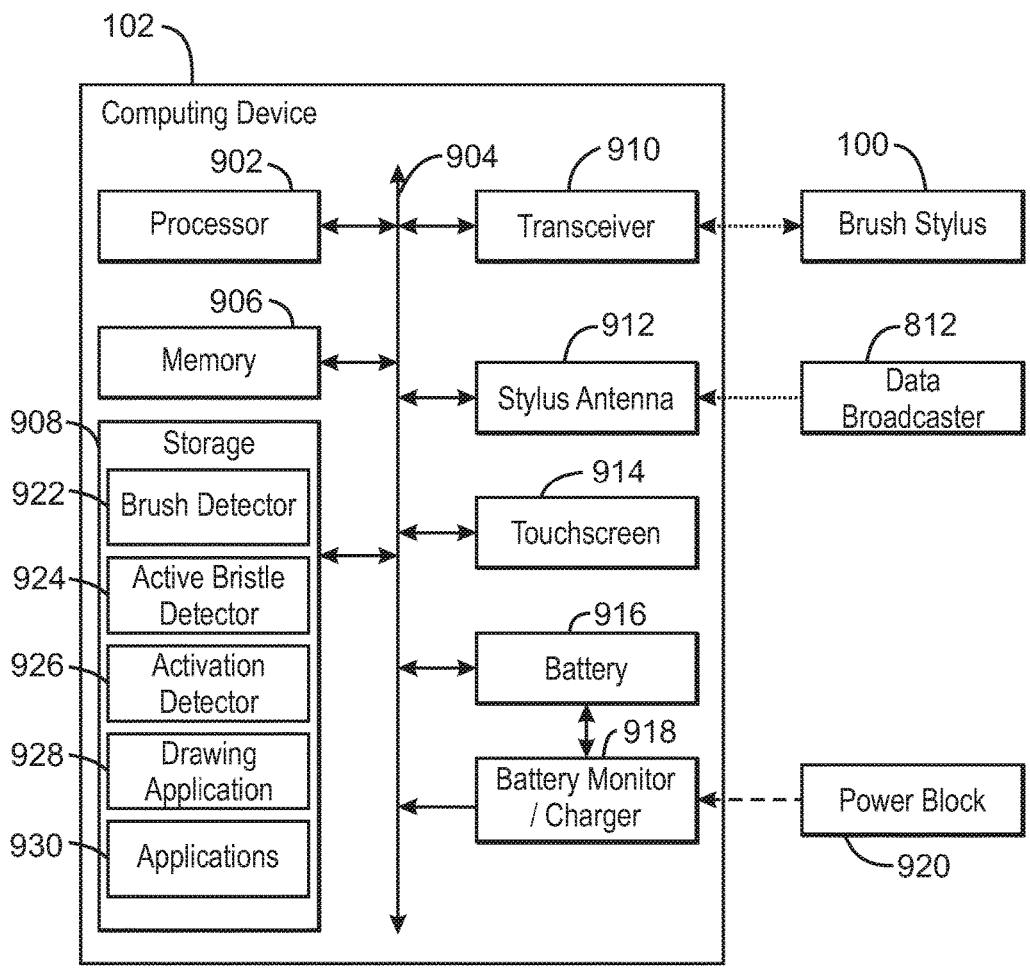
FIG. 9 is a block diagram of an example of components that may be present in a computing device that uses a brush stylus in accordance with some embodiments.

FIG. 9 is a block diagram of an example of components that may be present in a computing device 102 that uses a brush stylus 100 in accordance with some embodiments. Like numbered items are as described with respect to FIGS. 1 and 8. The computing device 102 may include any combinations of the components shown in the example. The components may be implemented as ICs, portions thereof, discrete electronic devices, or other modules, logic, hardware, software, firmware, or a combination thereof adapted in the brush stylus 100, or as components otherwise incorporated within a chassis of a larger system. The block diagram of FIG. 9 is intended to show a high-level view of components of the computing device 102. However, some of the components shown may be omitted, additional components may be present, and different arrangement of the components shown may occur in other implementations.

The computing device 102 may include a processor 902, which may be a microprocessor, a multi-core processor, a multithreaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

Other types of processors may be included to accelerate video processing for the three-dimensional display in the computing device 102. These may include, for example, a graphics processing unit (GPU), such as units available from Intel, Nvidia, and ATI, among others.

A system bus 904 may provide communications between system components. The system bus 904 may include any number of technologies, including industry standard architecture (ISA), extended ISA (EISA), peripheral component interconnect (PCI), peripheral component interconnect extended (PCIx), PCI express (PCIe), or any number of other technologies. The system bus 904 may be a proprietary bus, for example, used in a SoC based system. Further, the system bus 904 may include any combinations of these technologies, as well as other bus systems, such as an $I^2C$ interface, $I^3C$ interface, an SPI interface, point to point interfaces, and a power bus, among others. Different components may be coupled by different technologies in the system bus 904. For example, the processor 902 may be linked to a system memory 906 by high-speed point-to-point interfaces.

The processor 902 may communicate with the system memory 906 over the system bus 904, instead of, or in addition to, a high-speed point-to-point interface. The system memory 906 may include any number of memory devices of different types to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution for the brush stylus 100.

Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also be coupled to the processor 902, via the bus 904. To enable a thinner and lighter design for the computing device 102, the mass storage 908 may be implemented via a solid-state drive (SSD). Other devices that may be used for the mass storage 908 include flash memory cards, such as SD cards, microSD cards, xD picture cards, and the like.

In low power implementations, such a portable computing device 102 that is powered by battery, the mass storage 908 may include on-die memory or registers associated with the processor 902. However, in some examples, the mass storage 908 may be implemented using a micro hard disk drive (HDD). Further, any number of new technologies may be used for the mass storage 908 in addition to, or instead of, the technologies described, such resistance change memories, phase change memories, holographic memories, or chemical memories, among others. For example, the computing device 102 may incorporate the 3D XPOINT memories from Intel® and Micron®.

The system bus 904 may couple the processor 902 to a transceiver 910, for example, for communications with a brush stylus 100. The transceiver 910 may use any number of frequencies and protocols, such as 2.4 gigahertz (GHz) transmissions under the IEEE 802.15.4 standard, for example, using the Bluetooth® low energy (BLE) standard as defined by the Bluetooth® Special Interest Group, among others.

Any number of radios, configured for a particular wireless communication protocol, may be used for other connections, such as to a network. For example, a WLAN unit may be used to implement Wi-Fi™ communications in accordance with the Institute of Electrical and Electronics Engineers (IEEE) 802.11 standard. In addition, wireless wide area communications, such as according to a cellular or other wireless wide area protocol, can occur via a WWAN unit.

The system bus 904 may couple the processor 902 to stylus antenna 912, for example, disposed as a layer in a touch screen. The stylus antenna 912 may be used to receive data from a data broadcaster 812, such as in a brush stylus 100. In some examples, the stylus antenna 912 may also form part of a capacitance detector that locates a touch point on a touchscreen 914.

The touchscreen 914 may couple to the processor 902 through the bus 904 to provide the display of data, such as a line drawn using a brush stylus 100. The touchscreen 914 may also identify the location of touches on the screen for command entry and other input. The touchscreen 914 may use the stylus antenna 912 as part of the capacitance grid to identify the location of touches, or may have a separate capacitance grid in addition to a stylus antenna 912.

A battery 916 may power the computing device 102, although in examples in which the computing device 102 is configured to be placed in a fixed location, such as a large display device, it may have a power supply coupled to an electrical grid. The battery 916 may be a lithium ion battery, a metal-air battery, such as a zinc-air battery, an aluminum-air battery, a lithium-air battery, a hybrid super-capacitor, and the like.

A battery monitor/charger 918 may be included in the brush stylus 100 to track the state of charge (SoCh) of the battery 916. The battery monitor/charger 918 may be used to monitor other parameters of the battery 916 to provide failure predictions, such as the state of health (SoH) and the state of function (SoF) of the battery 916. The battery monitor/charger 916 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 918 may communicate the information on the battery 916 to the processor 902 over the bus 904. The battery monitor/charger 918 may also include an analog-to-digital (ADC) convertor that allows the processor 902 to directly monitor the voltage of the battery 916 or the current flow from the battery 918. The battery parameters may be used to determine actions that the brush stylus 100 may perform, for example, when battery reserves are low, such as user alerts, transmission frequency changes, network operation, and the like.

A power block 920, or other power supply coupled to a grid, may be coupled with the battery monitor/charger 918 to charge the battery 916, for example, through a wire coupled to a physical port on the computing device 102. In some examples, the power block 920 may be replaced with a wireless power receiver to obtain the power wirelessly, for example, through a loop antenna in the computing device 102. A wireless battery charging circuit, such as an LTC4020 chip from Linear Technologies of Milpitas, Calif., among others, may be included in the battery monitor/charger 918. The specific charging circuits chosen depend on the size of the battery 916, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 908 may include a number of modules to implement the functions described herein. Although shown as code blocks in the mass storage 908, it may be understood that any of the modules may be fully or partially replaced with hardwired circuits, for example, built into an application specific integrated circuit (ASIC).

The mass storage 908 may include a brush detector 922 to detect when a brush stylus 100, or other drawing device, contacts the touchscreen 914. This may be performed by the brush detector 922 using the stylus antenna 912, or a capacitive grid sensor built into the touchscreen 914. The brush detector 922 may identify a central point of contact for the brush stylus 100 on the touchscreen 914. This may also be performed in concert with an active bristle detector 924.

The active bristle detector 924 may be used to detect a touch from each of a number of active bristles. The active bristle detector 924 may also be used to obtain bristle data from the brush stylus 100, for example, through the transceiver 910, or through the stylus antenna 912. The bristle data may include the proximity of bristles to each other, pressure applied to bend a bristle, or both.

An activation detector 926 may be used to detect an activation signal from the brush stylus 100, through the transceiver 910 or through the stylus antenna 912. The data obtained from the activation detector 926 and the active bristle detector 924 may be provided to a drawing application 928. The drawing application 928 may display a line on the touchscreen when an activation signal is detected by the activation detector 926. The width of the line and the texture used for the line may be determined by pressure data provided by the brush stylus 100.

Other applications 930 may be included to perform other functions, such as spreadsheets, presentation software, and word processing. These applications 930 may use the data from the brush stylus 100 to control functionality during drawing. In some examples, the applications 930 may use the brush stylus 100 as a simple pointing device during regular operations, for example, using the center point of contact as a cursor control.

The computing device 102 is not limited to the components shown, but may have additional components to implement further functionality. For example, A network interface controller (NIC) may be included to provide a wired communication to a network. The wired communication may provide an Ethernet connection, or may be based on a proprietary network protocol, for example, designed for carrying high-speed video data. An additional NIC may be included to allow a connection to a second network, for example, a first NIC providing communications to the network, and a second NIC providing communications to other devices, such as input devices, over another network.

Figure 10:
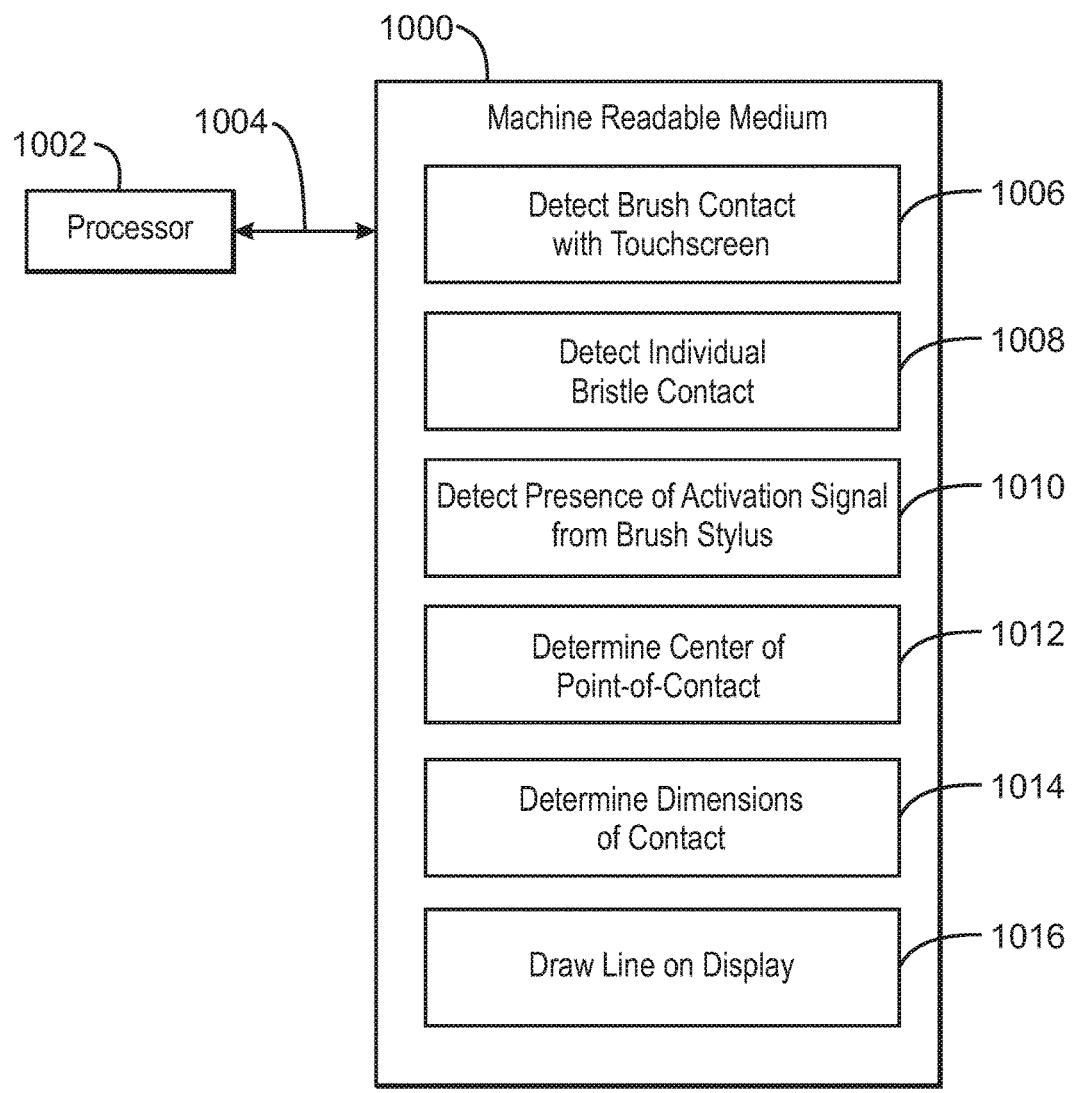
FIG. 10 is a block diagram of a non-transitory, machine readable medium that may include code to direct a processor in a computing device to use a brush stylus.

FIG. 10 is a block diagram of a non-transitory, machine readable medium 1000 that may include code to direct a processor in a computing device to use a brush stylus. The processor 1002 may access the non-transitory, machine readable medium 1000 over a bus 1004. The processor 1002 and bus 1004 may be selected as described with respect to the processor 902 and bus 904 of FIG. 9. The non-transitory, machine readable medium 1000 may include devices described for the mass storage 908 of FIG. 9 or may include optical disks, thumb drives, or any number of other hardware devices.

The non-transitory, machine readable medium 1000 may include code 1006 to direct the processor 1002 to detect a brush contact with a touchscreen, for example, by detecting the capacitance of an active bristle using a capacitance detector built into a touch screen display. The detection of the brush may also be implemented by detecting signals from the active bristles using a stylus antenna built into the touchscreen display. Code 1008 may be included to direct the processor 1002 detect individual active bristle contact points.

The machine readable medium 1000 may include code 1010 to detect the presence of an activation signal from brush stylus. This may be performed through a stylus antenna built into the touchscreen display or through wireless connection, such as a Bluetooth connection, once the computing device has been paired with the brush stylus. For example, the code 1010 may direct the processor 1002 to enable drawing or activation functions so long as the activation signal from the brush stylus is detected.

The machine readable medium 1000 may include code 1012 to determine a center for a point of contact for the active bristles from the brush stylus. The center point may be determined as an average of all the individual points of contact, or may be determined from a point of contact combined with data from the brush stylus that indicates the width of the contact.

The machine readable medium 1000 may include code 1014 to determine the dimensions of the contact, for example, the shape of the contact point. If contact points for individual bristles are not detected, the width of the contact point may be determined by pressure data provided by the brush stylus.

The machine readable medium 1000 may include code 1016 to draw a line on the touching display, for example, during a period of time that an activation signal is detected from the brush stylus. The width of the line may be determined by the dimensions of the contact, while the texture for the line may be selected using pressure data from the active bristles in the brush stylus.

EXAMPLES

Example 1 includes a system including a brush stylus, wherein the brush stylus includes a number of active bristles to provide data to the brush stylus, a computing device via the brush stylus, or both, when the brush stylus is in contact with a touchscreen on the computing device.

Example 2 includes the subject matter of example 1. In this example, the brush stylus includes a number of inactive bristles.

Example 3 includes the subject matter of either of examples 1 or 2. In this example, the brush stylus includes a button to direct the brush stylus to send an activation signal to the computing device.

Example 4 includes the subject matter of any of examples 1 to 3. In this example, an active bristle includes a structure including piezoelectric crystals to measure a bending pressure on the active bristle.

Example 5 includes the subject matter of any of examples 1 to 3. In this example, the brush stylus includes an analog-to-digital converter (ADC) to convert a voltage from piezoelectric crystals in the active bristle into a digital signal proportional to a bending pressure on the active bristle.

Example 6 includes the subject matter of any of examples 1 to 5. In this example, an active bristle includes a structure to measure a capacitance change between the active bristle and another active bristle.

Example 7 includes the subject matter of any of examples 1 to 6. In this example, the brush stylus includes a phase locked loop (PLL) coupled to two active bristles, wherein the PLL calculates a capacitance between two active bristles by measuring a frequency change.

Example 8 includes the subject matter of any of examples 1 to 7. In this example, an active bristle includes a tip that is detected by the computing device as a touch.

Example 9 includes the subject matter of any of examples 1 to 8. In this example, the brush stylus includes a data broadcaster to send data to the computing device via an antenna in a touchscreen in the computing device.

Example 10 includes the subject matter of any of examples 1 to 9. In this example, the brush stylus includes a transceiver to send data to the computing device via a radio connection.

Example 11 includes the subject matter of any of examples 1 to 10. In this example, a radio connection between the brush stylus and the computing device includes a Bluetooth connection.

Example 12 includes the subject matter of any of examples 1 to 11. In this example, the brush stylus includes a button to retract at least a portion of the number of active bristles into a case. The bristles that are retracted may be disabled.

Example 13 includes the subject matter of any of examples 1 to 12. In this example, a button is disengaged from a locking mechanism when pressed to allow the button to slide to a new position and reengage the locking mechanism at the new position, wherein a portion of active bristles are retracted into the case at the new position.

Example 14 includes the subject matter of any of examples 1 to 13. In this example, the brush stylus includes a wireless charging system to charge a battery.

Example 15 includes the subject matter of any of examples 1 to 14. In this example, the system includes the computing device, wherein the computing device includes a stylus antenna to receive data from the brush stylus via the number of active bristles.

Example 16 includes the subject matter of any of examples 1 to 15. In this example, the system includes the computing device, wherein the computing device includes a transceiver to receive data from the brush stylus via radio communications.

Example 17 includes the subject matter of any of examples 1 to 16. In this example, the system includes the computing device, wherein the computing device includes a multi-touch detector to detect a touch from each of the number of active bristles.

Example 18 includes the subject matter of any of examples 1 to 17. In this example, the system includes the computing device, including an activation detector to receive an activation signal from the brush stylus.

Example 19 includes a method for using a brush stylus to draw on a computing device, including:

detecting a brush stylus in contact with a touchscreen on the computing device;

obtaining data from the brush stylus via an active bristle;

determining that an activation signal from the brush stylus is present; and displaying a line on the touchscreen following the active bristle as the brush stylus is moved across the touchscreen.

Example 20 includes the subject matter of example 19. In this example, displaying the line on the touchscreen includes:

detecting the center of a contact of a number of active bristles on the brush stylus; and displaying the line centered on the center of the contact as the center of the contact is moved across the touchscreen.

Example 21 includes the subject matter of either of examples 19 or 20. In this example, detecting the brush stylus includes receiving a signal from the brush stylus via a stylus antenna disposed in the touchscreen.

Example 22 includes the subject matter of any of examples 19 to 21. In this example, detecting the brush stylus includes detecting a touch on the touchscreen from the active bristle via a capacitance sensor.

Example 23 includes the subject matter of any of examples 19 to 22. In this example, obtaining data includes receiving a signal from the brush stylus via a stylus antenna disposed in the touchscreen.

Example 24 includes the subject matter of any of examples 19 to 23. In this example, obtaining data includes receiving the data via a radio signal from the brush stylus.

Example 25 includes the subject matter of any of examples 19 to 24. In this example, the data includes a measurement of a pressure of the active bristle on the touchscreen.

Example 26 includes the subject matter of any of examples 19 to 25. In this example, the data includes a bend direction of an active bristle on the touchscreen.

Example 27 includes the subject matter of any of examples 19 to 26. In this example, the method includes detecting a location of a touch from a tip of each of a number of active bristles.

Example 28 includes the subject matter of any of examples 19 to 27. In this example, the method includes determining a width of the line on the touchscreen based, at least in part, on a measurement of pressure of a number of active bristles against the touchscreen.

Example 29 includes the subject matter of any of examples 19 to 28. In this example, the method includes determining a width of the line on the touchscreen based, at least in part, on a location of a touch from a tip of each of a number of active bristles.

Example 30 includes the subject matter of any of examples 19 to 29. In this example, the method includes determining a simulated texture of the line on the touchscreen based, at least in part, on a measurement of pressure of the active bristle.

Example 31 includes the subject matter of any of examples 19 to 30. In this example, the method includes:

determining that an activation signal is no longer present from the brush stylus; and terminating the display of the line on the touchscreen.

Example 32 includes a non-transitory, machine readable medium including code that, when executed, directs a processor to detect a contact of a brush stylus with a touchscreen, wherein the contact includes contact of a number of active bristles with the touchscreen. The code, when executed, directs the processor to detect an activation signal from the brush stylus, determine a center of a point of contact of the number of active bristles with the touchscreen, and draw a line on the touchscreen as the center of the point of contact is moved across the touchscreen.

Example 33 includes the subject matter of any of examples 32 to 33. In this example, the non-transitory, machine readable medium includes code that, when executed, directs the processor to detect a location of contact of each of the number of active bristles with the touchscreen, and determine the center of the point of contact based, at least in part, on the location of contact of each of the number of active bristles.

Example 34 includes the subject matter of any of examples 32 to 34. In this example, the non-transitory, machine readable medium includes code that, when executed, directs the processor to determine dimensions around the center of the point of contact, based, at least in part, on data obtained from the brush stylus.

Example 35 includes the subject matter of any of examples 32 to 35. In this example, the non-transitory, machine readable medium includes code that, when executed, directs the processor to determine that the activation signal from the brush stylus is no longer present, and terminate the drawing of the line.

Example 36 includes a brush stylus for a computing device, wherein the brush stylus includes a number of active bristles to provide data to the brush stylus, the computing device via the brush stylus, or both, when the brush stylus is in contact with a touchscreen on the computing device.

Example 37 includes the subject matter of example 36. In this example, the brush stylus includes a number of inactive bristles.

Example 38 includes the subject matter of either of examples 36 or 37. In this example, the brush stylus includes a button to direct the brush stylus to send an activation signal to the computing device.

Example 39 includes the subject matter of any of examples 36 to 38. In this example, an active bristle includes a structure including piezoelectric crystals to measure a bending pressure on the active bristle.

Example 40 includes the subject matter of any of examples 39 to 39. In this example, the brush stylus includes an analog-to-digital converter (ADC) to convert a voltage from piezoelectric crystals in the active bristle into a digital signal proportional to a bending pressure on the active bristle.

Example 41 includes the subject matter of any of examples 36 to 40. In this example, an active bristle includes a structure to measure a capacitance change between the active bristle and another active bristle.

Example 42 includes the subject matter of any of examples 36 to 41. In this example, the brush stylus includes a phase locked loop (PLL) coupled to two active bristles, wherein the PLL measures a capacitance between two active bristles by measuring a frequency change.

Example 43 includes the subject matter of any of examples 36 to 42. In this example, an active bristle includes a tip that is detected by the computing device as a touch.

Example 44 includes the subject matter of any of examples 36 to 43. In this example, the brush stylus includes a data broadcaster to send data to the computing device via an antenna in a touchscreen in the computing device.

Example 45 includes the subject matter of any of examples 36 to 44. In this example, the brush stylus includes a transceiver to send data to the computing device via a radio connection.

Example 46 includes the subject matter of any of examples 36 to 45. In this example, a radio connection between the brush stylus and the computing device includes a Bluetooth connection.

Example 47 includes the subject matter of any of examples 36 to 46. In this example, the brush stylus includes a button to retract at least a portion of the number of active bristles into a case.

Example 48 includes the subject matter of any of examples 36 to 47. In this example, a button is disengaged from a locking mechanism when pressed to allow the button to slide to a new position and reengage the locking mechanism at the new position, wherein a portion of active bristles are retracted into the case at the new position.

Example 49 includes the subject matter of any of examples 36 to 48. In this example, the brush stylus includes a wireless charging system to charge a battery.

Example 50 includes a system including a brush stylus, wherein the brush stylus includes a number of active bristles wherein each active bristle includes a means to obtain data about a contact with a surface.

Example 51 includes the subject matter of any of example 50. In this example, the brush stylus includes a means to send an activation signal to a computing device.

Example 52 includes the subject matter of either of examples 50 or 51. In this example, the brush stylus includes a means to send data to a computing device.

Example 53 includes the subject matter of any of examples 50 to 52. In this example, the brush stylus includes a means to retract at least a portion of the number of active bristles into a case.

Example 54 includes the subject matter of any of examples 50 to 53. In this example, the system includes a computing device, wherein the computing device includes a means to receive data about the contact with the surface.

Example 55 includes the subject matter of any of examples 50 to 54. In this example, the system includes the computing device, wherein the computing device includes a means to receive data from the brush stylus.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system comprising a brush stylus, wherein the brush stylus comprises a plurality of active bristles to provide data to the brush stylus, a computing device via the brush stylus, or both, when the brush stylus is in contact with a touchscreen of the computing device, wherein an active bristle from the plurality of active bristles comprises a structure comprising piezoelectric crystals to measure a bending pressure on the active bristle.

2. The system of claim 1, wherein the brush stylus comprises an analog-to-digital converter (ADC) to convert a voltage from piezoelectric crystals in the active bristle into a digital signal proportional to a bending pressure on the active bristle.

3. The system of claim 1, wherein an active bristle comprises a structure to measure a capacitance change between the active bristle and another active bristle.

4. The system of claim 3, wherein the brush stylus comprises a phase locked loop (PLL) coupled to two active bristles, wherein the PLL calculates a capacitance between the two active bristles by measuring a frequency change.

5. The system of claim 1, wherein an active bristle comprises a tip that is detected by the computing device as a touch.

6. The system of claim 1, wherein the brush stylus comprises a data broadcaster to send data to the computing device via an antenna in a touchscreen in the computing device.

7. The system of claim 1, wherein the brush stylus comprises a transceiver to send data to the computing device via a radio connection.

8. The system of claim 1, wherein the brush stylus comprises an actuator to retract at least a portion of the plurality of active bristles into the brush stylus.

9. The system of claim 8, wherein the actuator is disengaged from a locking mechanism when pressed to allow the actuator to slide to a new position and reengage the locking mechanism at the new position, wherein the portion of active bristles are retracted into the case at the new position.

10. The system of claim 8, wherein the portion of active bristles that are retracted are disabled.

11. A method for using a brush stylus to draw on a computing device, comprising:
    detecting a brush stylus in contact with a touchscreen on the computing device;
    obtaining data from the brush stylus via a plurality of active bristles, wherein an active bristle from the plurality of active bristles comprises a structure comprising piezoelectric crystals to measure a bending pressure on the active bristle;
    determining that an activation signal from the brush stylus is present; and
    displaying a line on the touchscreen as the brush stylus is moved across the touchscreen.

12. The method of claim 11, wherein displaying the line on the touchscreen comprises:
    detecting the center of a contact of the plurality of active bristles on the brush stylus; and
    displaying the line centered on the center of the contact as the center of the contact is moved across the touchscreen.

13. The method of claim 11, wherein detecting the brush stylus comprises detecting a touch on the touchscreen from an active bristle via a capacitance sensor.

14. The method of claim 11, wherein obtaining data comprises receiving a signal from a brush stylus via a stylus antenna disposed in the touchscreen.

15. The method of claim 11, wherein obtaining data comprises receiving the data via a radio signal from the brush stylus.

16. The method of claim 11, wherein the data comprises a measurement of a pressure of an active bristle on the touchscreen.

17. The method of claim 11, wherein the data comprises a bend direction of an active bristle on the touchscreen.

18. The method of claim 11, comprising detecting a location of a touch from a tip of each of the plurality of active bristles.

19. The method of claim 11, comprising determining a width of the line on the touchscreen based, at least in part, on a measurement of pressure of the plurality of active bristles against the touchscreen.

20. The method of claim 11, comprising determining a width of the line on the touchscreen based, at least in part, on a location of a touch from a tip of each of the plurality of active bristles.

21. The method of claim 11, comprising determining a simulated texture of the line on the touchscreen based, at least in part, on a measurement of pressure of an active bristle.

22. The method of claim 11, comprising:
    determining that an activation signal is no longer present from the brush stylus; and
    terminating the display of the line on the touchscreen.

23. A non-transitory, machine readable medium comprising code that, when executed, directs a processor to:
    detect a contact of a brush stylus with a touchscreen, wherein the contact comprises contact of a plurality of active bristles with the touchscreen wherein an active bristle from the plurality of active bristles comprises a structure comprising piezoelectric crystals to measure a bending pressure on the active bristle;
    detect an activation signal from the brush stylus;
    determine a center of a point of contact of the plurality of active bristles with the touchscreen; and
    draw a line on the touchscreen as the center of the point of contact is moved across the touchscreen.

24. The non-transitory, machine readable medium of claim 23, comprising code that, when executed, directs the processor to:
    detect a location of contact of each of the plurality of active bristles with the touchscreen; and
    determine the center of the point of contact based, at least in part, on the location of contact of each of the plurality of active bristles.

25. The non-transitory, machine readable medium of claim 23, comprising code that, when executed, directs the processor to determine dimensions around the center of the point of contact, based, at least in part, on data obtained from the brush stylus.

* * * * *